United States Patent [19]

Kubo et al.

[11] 4,188,839

[45] Feb. 19, 1980

[54] THROTTLING CONTROL VALVE AND A SYSTEM FOR CONTROLLING DOWNSHIFT TIMING OF AN AUTOMATIC TRANSMISSION FOR VEHICLES

[75] Inventors: Seitoku Kubo; Kunio Morisawa, both of Toyota, Japan

[73] Assignee: Toyota Jidosha Kogyo Kabushiki Kaisha, Toyota, Japan

[21] Appl. No.: 914,945

[22] Filed: Jun. 12, 1978

[30] Foreign Application Priority Data

Feb. 17, 1978 [JP] Japan .................................. 53/17180

[51] Int. Cl.² ............................................. B60K 17/00
[52] U.S. Cl. .................................. 74/869; 137/625.3
[58] Field of Search ................ 74/865, 867, 868, 869; 137/58, 625.3

[56] References Cited

U.S. PATENT DOCUMENTS

| | | | |
|---|---|---|---|
| 2,788,678 | 4/1957 | Sheppard | 74/869 X |
| 3,587,353 | 6/1971 | Iisima | 74/868 |
| 3,587,354 | 6/1971 | Oguma | 137/625.3 |
| 3,685,372 | 8/1972 | Miyazaki | 74/869 X |
| 3,747,439 | 7/1973 | Uozomi et al. | 74/869 |
| 3,765,454 | 10/1973 | Carl | 137/625.3 X |
| 3,774,629 | 11/1973 | Enomoto | 74/867 |
| 3,949,627 | 4/1976 | Murakami | 74/869 X |
| 3,978,743 | 9/1976 | Murakami | 74/869 |
| 4,050,332 | 9/1977 | Taga | 74/869 |
| 4,106,369 | 8/1978 | Taga | 74/869 |

FOREIGN PATENT DOCUMENTS 1905669 8/1969 Fed. Rep. of Germany ............. 74/867
52-18344 6/1977 Japan .

*Primary Examiner*—Thomas J. Holko
*Attorney, Agent, or Firm*—Finnegan, Henderson, Farabow & Garrett

[57] ABSTRACT

A throttling control valve having a spool-like valve element which is gradually shifted in accordance with increase of a control fluid pressure so as to provide four different passage connections therethrough so as to be able to provide four different flow resistances, and a system for controlling downshift timing of an automatic transmission for vehicles which employs this throttling control valve so as to change delay time in supplying fluid pressure to a lower speed friction engaging means in accordance with governor pressure.

4 Claims, 10 Drawing Figures

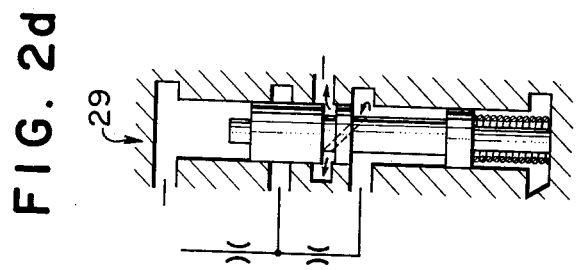
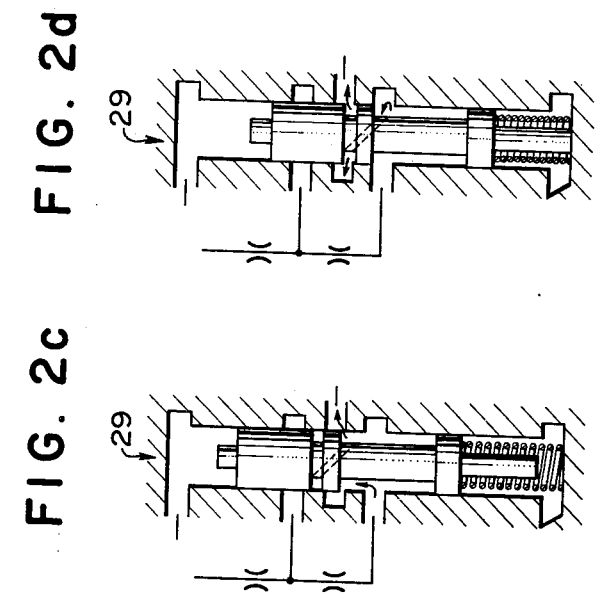
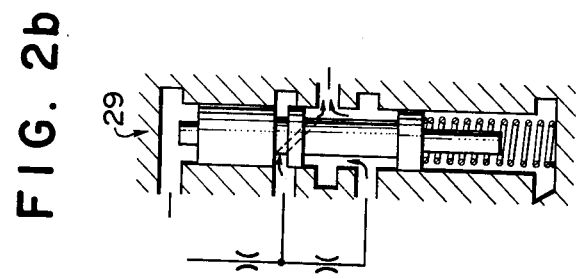
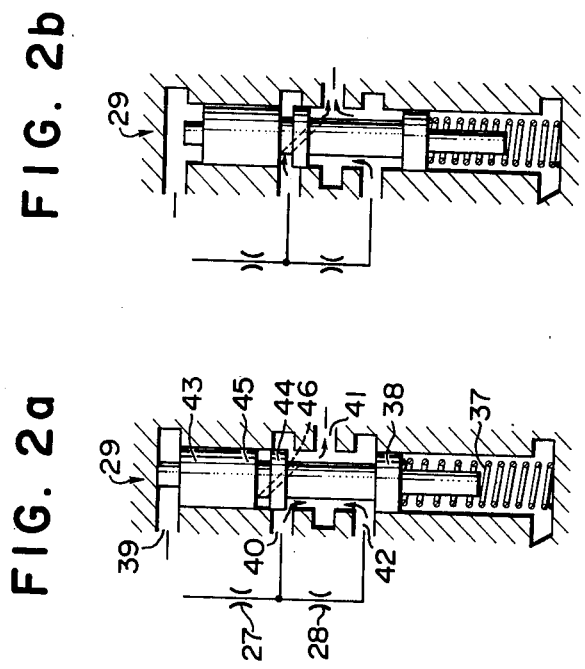
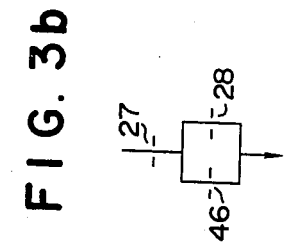
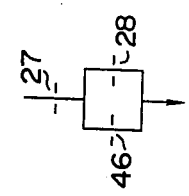
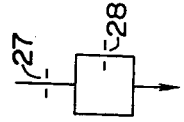

4,188,839

THROTTLING CONTROL VALVE AND A SYSTEM FOR CONTROLLING DOWNSHIFT TIMING OF AN AUTOMATIC TRANSMISSION FOR VEHICLES

BACKGROUND OF THE INVENTION

The present invention relates to a throttling control valve for use in an oil pressure control circuit or the like and also to a system for controlling downshift timing of an automatic transmission for vehicles which employs this throttling control valve.

An automatic transmission for vehicles which comprises a fluid torque converter and a change-over gear mechanism including a plurality of friction engaging means for setting the transmission to various speed stages is so adapted that it is automatically set to the most desirable shift condition in accordance with the operating condition of the vehicle by automatically changing over engagement of the friction engaging means. Such an automatic change-over of engagement of the friction engaging means is generally controlled by an oil pressure control means which comprises a source of line pressure, a source of throttle pressure which increases in accordance with increase of the depression of the accelerator pedal or the opening of the intake throttle valve, a source of governor pressure which increases in accordance with increase of the vehicle speed, and a speed shift valve which is shifted between first and second positions so as to set the transmission to either of two speed stages in accordance with the balance between the throttle pressure and the governor pressure. When the speed shift valve is shifted to said first position, it connects the source of line pressure to a first friction engaging means which sets the transmission to a lower speed stage when it is engaged, while it connects a second friction engaging means, which sets the transmission to a higher speed stage when it is engaged, to a drain passage. On the other hand, when the speed shift valve is shifted to said second position, it connects the source of line pressure to the second friction engaging means, while it connects the first friction engaging means to a drain passage. In this connection, in order to provide a proper overlapping between the supply and the exhaust of oil pressure to and from the lower speed friction engaging means and the higher speed friction engaging means so as to accomplish smooth changeover between the two speed stages, the oil pressure control means generally further comprises accumulators connected individually to passages for supplying and exhausting oil pressure to and from the lower and higher speed friction engaging means.

In an automatic transmission of this kind, when the transmission is shifted down from the higher speed stage to the lower speed stage, the speed shift valve is shifted from the said second shift position to the said first shift position, and, in accordance with this, the line pressure which has been supplied to the higher speed friction engaging means by way of the speed shift valve is now exhausted toward a drain passage, while on the other hand the lower speed friction engaging means which has been connected to a drain passage is now supplied with the line pressure by way of the spaced shift valve. In this case, in accordance with the shifting of the speed shift valve, the oil pressure in the higher speed friction engaging means lowers immediately and rapidly by a certain amount, and thereafter this pressure level is maintained for a while at an accumulator pressure level because the exhaust of oil is compensated for by the delivery of oil from the higher speed accumulator due to shifting of its piston. After the piston of the accumulator has shifted through its stroke, the oil pressure again rapidly lowers, and at a middle portion of the lowering process the higher speed friction engaging means is substantially disengaged. On the other hand, although the lower speed friction engaging means is supplied with oil pressure immediately after the change-over of the speed shift valve, the supply of oil in the initial stage is consumed for driving the piston of the lower speed friction engaging means through its clearance stroke, and therefore the pressure level in the lower speed friction engaging means does not make any substantial rise. After the piston has moved through its clearance stroke, the oil pressure in the lower speed friction engaging means begins rapidly to rise, and at a middle portion of its rising process the lower speed friction engaging means is substantially engaged. Thereafter the oil pressure is maintained for a while at a certain accumulator pressure level as the piston of the lower speed accumulator moves and absorbs the supply of oil, and, after the piston of the accumulator has moved through its stroke, the oil pressure in the lower speed friction engaging means rises finally to the level of the line pressure. In order to accomplish this downshifting due to the change-over of oil pressure smoothly without causing a shift shock to the vehicle, there must be a proper time lag between the time point at which the higher speed friction engaging means is substantially disengaged in the course of exhausting oil pressure from the higher speed friction engaging means and the time point at which the lower speed friction engaging means is substantially engaged in the course of supplying oil pressure to the lower speed friction engaging means, because for smooth shifting it is required that the rotational speed of the engine at the instant of engaging the lower speed friction engaging means should be higher than the rotational speed of the engine at the instant of disengaging the higher speed friction engaging means by an amount corresponding to the ratio between the reduction ratios of the lower and higher speed stages, and in order to accomplish this increase of rotational speed the engine requires a certain time after the disengagement of the higher speed friction engaging means.

In connection with this required increase of the rotational speed of the engine, it must be noted that although the rate of increase required for the rotational speed of the engine is constant, the absolute value of increase required for the rotational speed of the engine differs in accordance with the rotational speed of the engine before the downshifting, i.e. the vehicle speed before the downshifting. For example, let us assume that the proportional increase of the reduction ratio due to downshifting is 1.5. If the rotational speed of the engine before downshifting is 2000 rpm, it is required that the engine should increase its rotational speed by 1000 rpm, from 2000 rpm to 3000 rpm. On the other hand, if the rotational speed of the engine before downshifting is 4000 rpm, it is required that the engine should increase its rotational speed by 2000 rpm, from 4000 rpm to 6000 rpm. Therefore, when the vehicle speed is higher before downshifting, the increase of the rotational speed of the engine required for smooth downshifting is larger. Although the rate of increase of the rotational speed of the engine is also affected by the magnitude of the engine torque, i.e. the opening of the intake throttle valve or the level of the throttle pressure, the time required for accomplishing the increase of the rotational speed of the engine required for smooth downshifting, i.e. the time interval between the time point at which the higher speed friction engaging means is substantially disengaged and the time point at which the lower speed friction engaging means is substantially engaged, differs in accordance with the vehicle speed before downshifting, said time interval being required to be larger when the vehicle speed before downshifting is higher.

In view of the abovementioned requirement, it has been proposed in Japanese Patent Application No. 94523/71 (Japanese Patent Publication No. 18344/77), filed by the assignee company of the present application, to incorporate a throttling control valve in a passage for supplying oil pressure to the lower speed friction engaging means, said throttling control valve being adapted to be changed over by the governor pressure so as to provide different throttling ratios to the passage in accordance with the magnitude of the governor pressure. The throttling control valve proposed in the former application is an ON/OFF valve which controls a bypass passage which bypasses a throttling element provided in the passage for supplying oil pressure to the lower speed friction engaging means and operates so as to open the bypass passage when the governor pressure is lower than a predetermined level so that the supply of oil pressure to the lower speed friction engaging means is performed more quickly and so as to interrupt the bypass passage when the governor pressure is higher than the predetermined level so that the supply of oil pressure to the lower speed friction engaging means is performed more slowly. In this former proposal, the throttling ratio applied to the passage for supplying oil pressure to the lower speed friction engaging means is changed between two values in accordance with the magnitude of the governor pressure.

SUMMARY OF THE INVENTION

In view of the aforementioned requirement with regard to the oil pressure control means in an automatic transmission and in view of the very limited number of different throttling ratios available from the aforementioned prior throttling control valve, it is the primary object of the present invention to provide a novel throttling control valve which can provide four different throttling ratios for a passage in accordance with the magnitude of a control fluid pressure.

Another object of the present invention is to provide a system for controlling downshift timing of an automatic transmission for vehicles which accomplishes much improved downshift performance of the transmission by providing four different time intervals between the disengagement of a higher speed friction engaging means and the engagement of a lower speed friction engaging means in the downshift process in accordance with the vehicle speed before the downshifting.

BRIEF DESCRIPTION OF THE DRAWING

The present invention will become more fully understood from the detailed description given herein below and the accompanying drawings, which are given by way of illustration only, and thus are not limitative of the present invention, and wherein:

FIGS. 2a–2d are sectional views of the throttling control valve shown in FIG. 1, illustrated in various operational conditions;

FIGS. 3a–3d are diagrams showing the throttling structure obtained by the various operational conditions of the throttling control valve shown in FIGS. 2a–2d.

DESCRIPTION OF THE PREFERRED EMBODIMENT

Figure 1:
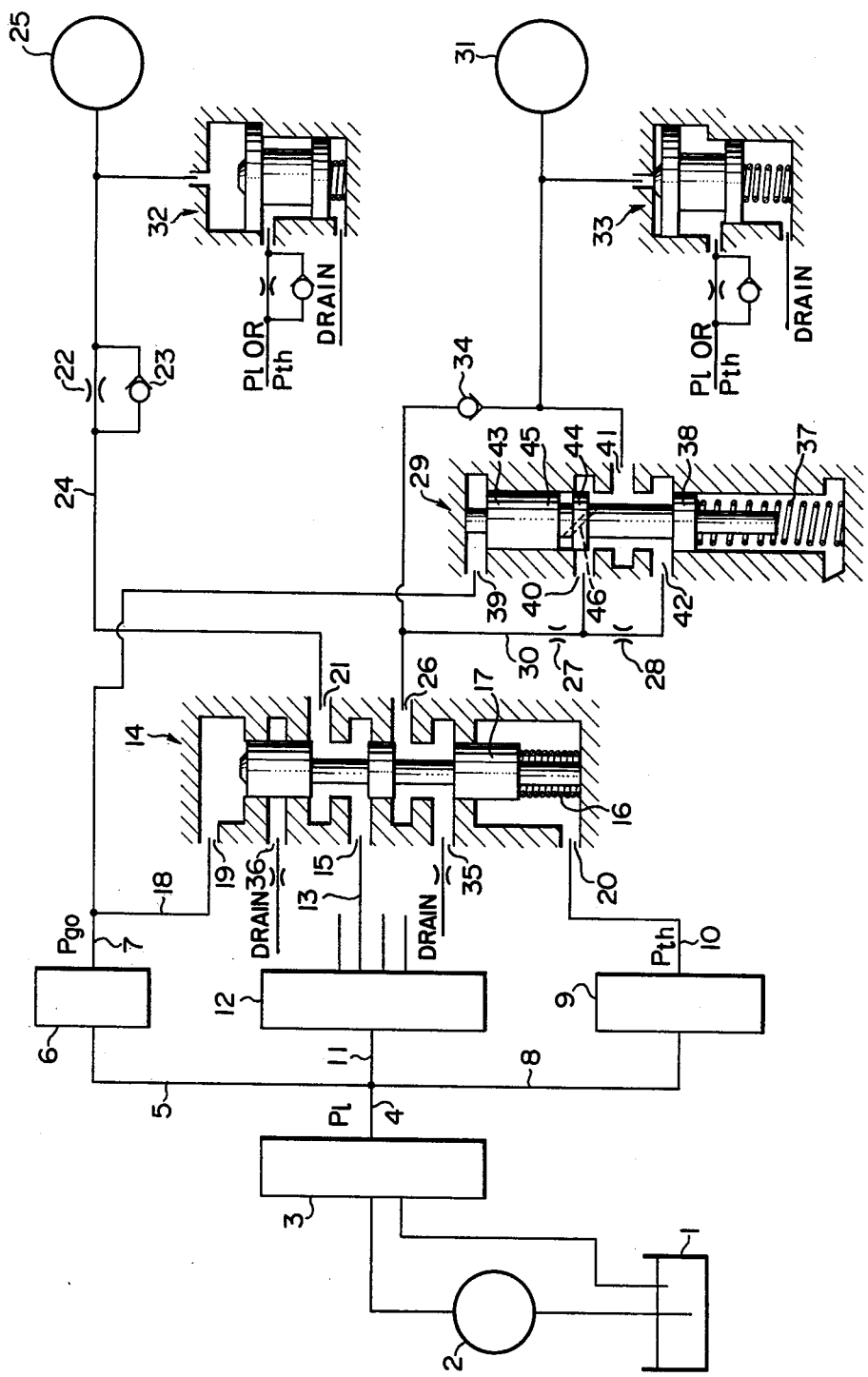
FIG. 1 is a diagram showing the oil pressure circuit of an oil pressure control means for an automatic transmission for vehicles in which an embodiment of the throttling control valve of the present invention is incorporated.

Referring to FIG. 1, 1 designates an oil reservoir from which oil is pumped up by an oil pump 2 so as to provide a source of oil pressure, from which pressurized oil is supplied to a line pressure control valve 3, which in turn provides a flow of oil having a predetermined level of pressure, i.e. line pressure Pl, in a passage 4. The line pressure is supplied to a governor pressure control valve 6 through a passage 5, which provides a flow of oil having a pressure level which increases in accordance with increase of the vehicle speed, i.e. governor pressure Pgo, in a passage 7. The line pressure is also supplied to a throttle pressure control valve 9 through a passage 8, which provides throttle pressure Pth, which increases in accordance with increase of the opening of the intake throttle valve of the engine or the depression of the accelerator pedal, in a passage 10. Furthermore, the line pressure is supplied to a manual shift valve 12 through a passage 11, wherefrom the line pressure is conducted through some passage 13 in accordance with the shifting position of the manual shift valve so as to be supplied to a port 15 of a speed shift valve 14. The speed shift valve 14 has a spool-like valve element 17 resiliently driven upward in the figure by a compression coil spring 16. The upper end in the figure of the valve element 17 is exposed to the action of the governor pressure supplied to a port 19 through a passage 18, while on the other hand the lower end in the figure of the valve element is exposed to the throttle pressure supplied to a port 20 through the passage 10. Therefore the valve element 17 is shifted up and down depending upon the balance between the governor pressure and the throttle pressure, modified, of course, by the action of the compression coil spring 16. In other words, if the throttle pressure decreases below a predetermined level relative to the governor pressure, the valve element 17 is shifted downward in the figure, so that the line pressure supplied to the port 15 is conducted to a port 21, wherefrom it is conducted through a passage 24 including a parallel circuit of a throttle element 22 and a check valve 23 at a middle portion thereof and is supplied to a higher speed friction engaging means (high clutch) 25. By contrast, if the governor pressure is lower than a predetermined level relative to the throttle pressure, the valve element 17 is shifted upward in the figure, so that the line pressure supplied to the port 15 is conducted to a port 26, wherefrom the line pressure is conducted through a passage 30 including throttling elements 27 and 28 and a throttle control valve of the present invention 29 so as to be supplied to a lower speed friction engaging means (low clutch) 31. At a middle portion of the passage 24 is connected a higher speed accumulator 32, and similarly a lower speed accumulator 33 is connected at a middle portion of the passage 30. When the valve element 17 of the speed shift valve 14 is shifted downward as shown in the figure, the low clutch 31 is connected to the port 26 of the speed shift valve 14 in a manner of bypassing the throttling control valve 29 through a check valve 34 so that the low clutch 31 is connected to a drain port 35 of the speed shift valve 14 without passing through the throttling control valve 29. When the valve element 17 of the speed shift valve 14 is shifted upward in the figure, the high clutch 25 is connected to the port 21 of the speed shift valve 14 through the passage 24 including the check valve 23 so that the high clutch 25 is connected to a drain port 36 of the speed shift valve 14.

The throttling control valve 29 has a spool-like valve element 38 resiliently pushed upward in the figure by a compression coil spring 37. The housing of the throttling control valve has a control fluid pressure port 39 and a series of first, second, and third ports 40, 41, and 42. In the shown embodiment of the oil pressure circuit, the first port 40 is connected to the port 26 of the speed shift valve 14 through the throttling element 27, the second port 41 is connected to the low clutch 31, and the third port 42 is connected to the port 26 of the speed shift valve 14 through the series connection of the throttling elements 28 and 27. The valve element 38 has a drive land 43 which receives the fluid pressure supplied to the control fluid pressure port 39 so as to generate a force for driving the valve element downward in the figure against the action of the compression coil spring 37, a first land 44 which interrupts either the connection between the first port 40 and the second port 41 or the connection between the second port 41 and the third port 42 in accordance with the shift position of the valve element, and a second land 45 which opens or closes the first port 40. In the shown embodiment, the drive land 43 and the second land 45 are formed as a single unitary land. The valve element 38 has a throttled passage 46 which connects opposite sides of the first land 44.

FIGS. 2a–2d are views showing the throttling control valve 29 in various shift conditions effected in accordance with the magnitude of the control fluid pressure, i.e. the governor pressure in the present case, supplied to the control fluid pressure port 39. In the condition shown in FIG. 2a, the governor pressure supplied to the port 39 is lower than a predetermined level, so that the valve element 38 is shifted to its uppermost position by the action of the compression coil spring 37. In this condition, the land 44 is positioned so as not to interrupt the connection between the ports 40, 41, and 42, while the land 45 is positioned so as to open the port 40. In this condition, therefore, the ports 40, 41, and 42 are mutually connected so that the ports 40 and 42 serving as the inlet port are both connected with the port 41 serving as the outlet port.

FIG. 2b shows the condition of the throttling control valve 29 in such a condition that the valve element 38 is shifted slightly downward in the figure against the action of the compression coil spring 37 due to increase of the governor pressure supplied to the port 39 beyond a first predetermined level. In this condition, the land 44 interrupts the connection between the ports 40 and 41, while the land 45 still opens the port 40. In this condition, therefore, since the land 44 is adapted to interrupt either the connection between the lands 40 and 41 or the connection between the lands 41 and 42, as a matter of course the ports 41 and 42 are mutually connected. In this shift condition of the valve element 38, the port 40 serving as an inlet port is connected with the port 41 serving as an outlet port through the throttled passage 46, while on the other hand the port 42 serving as an inlet port is directly connected with the port 41 serving as an outlet port.

FIG. 2c shows the throttling control valve 29 in a third condition wherein the valve element 38 is further shifted downward in the figure due to further increase of the governor pressure supplied to the port 39. In this condition, the land 45 closes the port 40, and therefore, regardless of the shift position of the land 44, the port 40 serving as an inlet port is isolated from the port 41 serving as an outlet port. On the other hand, in this condition the land 44 does not yet interrupt the connection between the ports 41 and 42 so that these ports are still mutually connected. In this condition, therefore, the port 42 only is directly connected with the port 41.

FIG. 2d shows the throttling control valve 29 in such a condition that the valve element 38 is shifted to the lowermost position in the figure due to further increase of the governor pressure supplied to the port 39. In this condition, the land 44 interrupts the connection between the ports 41 and 42, while the land 45 also closes the port 40. In this condition, therefore, the port 42 only is connected with the port 41 through the throttled passage 46.

FIGS. 3a–3d are diagrams showing the throttling structure provided by the combination of the throttling elements 27 and 28 and the throttling control valve 29 in accordance with the various shifting conditions of the valve element 38 as shown in FIGS. 2a–2d. The throttling structures shown in FIGS. 3a–3d correspond to the shifting conditions of the throttling control valve 29 shown in FIGS. 2a–2d, respectively. As apparent from FIGS. 3a–3d, as the valve element 38 is shifted from the position shown in FIG. 2a to the condition shown in FIG. 2d, i.e. as the governor pressure increases from a predetermined relatively low level to a predetermined relatively high level, the throttling ratio of the throttling structure composed of the throttling elements 27 and 28 and the throttling control valve 29 increases in four steps.

Figure 4:
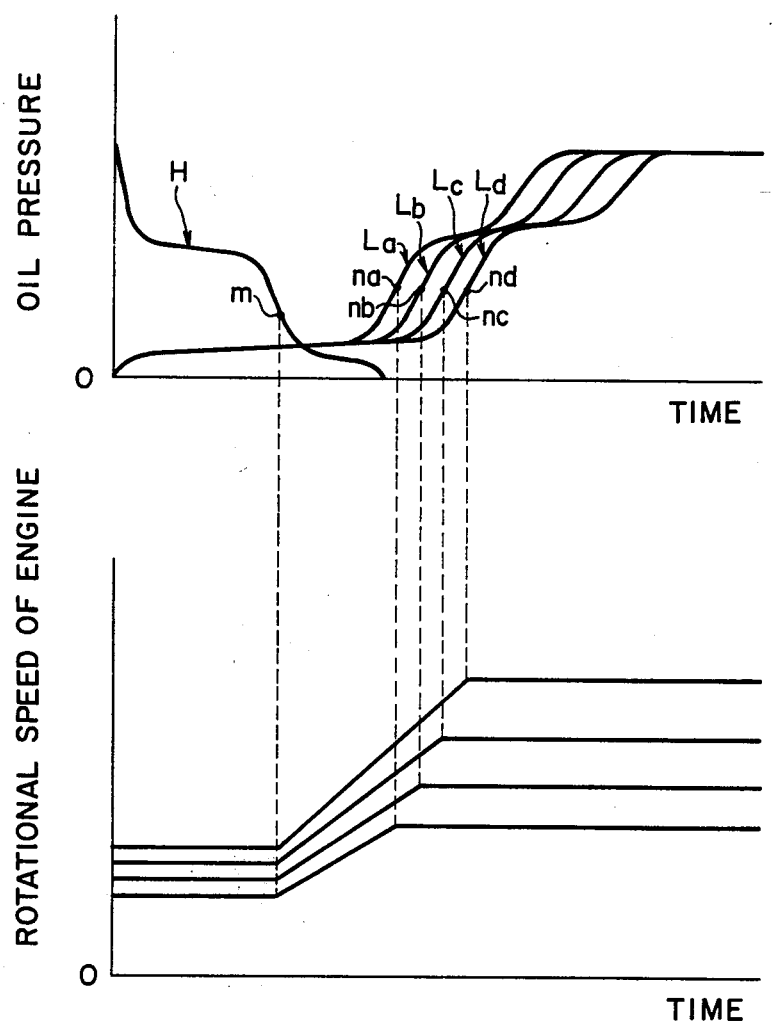
FIG. 4 shows a graph illustrating the changes of the oil pressures in higher and lower friction engaging means and the change of the rotational speed of the engine during downshifting.

FIG. 4 shows graphs illustrating changes of the oil pressure in the high clutch and the low clutch during downshifting performed by the oil pressure control means shown in FIG. 1, and corresponding changes of the rotational speed of the engine. In the oil pressure diagram, line H shows the path of the high clutch oil pressure, and lines La, Lb, Lc and Ld show the paths of the low clutch oil pressure obtained by the shifting conditions of the throttling control valve 29 shown in FIGS. 2a, 2b, 2c, and 2d, respectively. A relatively horizontal region in the path of the high clutch oil pressure shown by the line H is the region in which the higher pressure accumulator is operating, and similarly relatively horizontal regions in the paths of the low clutch oil pressure shown by the lines La–Ld are the regions in which the lower speed accumulator is operating. At point m on the line H, the high clutch is substantially disengaged, and similarly at points na–nd on the lines La–Ld the low clutch is substantially engaged. In this case, if the time intervals between the point m at which the high clutch is substantially disengaged and the points na–nd at which the low clutch is substantially engaged are controlled so as to be properly increased in accordance with increase of the vehicle speed, in such time intervals the engine just makes the increase of rotational speed which is required to accomplish smooth downshifting in those particular vehicle speed conditions. In this manner, smooth downshifting of an automatic transmission is available by the present invention over a wide range of vehicle speeds.

Although in the above the invention has been shown and described with respect to a preferred embodiment of the throttling control valve and to a system for controlling downshift timing of an automatic transmission for vehicles as an example of application of this throttling control valve, it should be understood by those skilled in the art that various changes and omissions of the form and detail thereof with regard to the embodiment of the throttle control valve and with regard to the example of its application may be made without departing from the scope of the invention.

We claim:

1. A throttling control valve comprising a valve housing having a control fluid pressure port, and a series of first, second, and third ports, a spool-like valve element having a drive land which receives the fluid pressure supplied to said control fluid pressure port so as to generate a force for driving said valve element, a first land which interrupts either the connection between said first and second ports or the connection between said second and third ports in accordance with the shift position of said valve element, a second land which opens or closes said first port, and a throttled passage which connects opposite sides of said first land, and a spring which acts on said valve element, wherein said valve element is movable against the action of said spring in accordance with increase of said driving force from a first shift position where said first land does not interrupt the connection between said first, second and third ports and said second land opens said first port, through a second shift position where said first land interrupts the connection between said first and second ports and said second land opens said first port, through a third shift position where said first land does not interrupt the connection between said second and third ports and said second land closes said first port, to a fourth shift position where said first land interrupts the connection between said second and third ports and said second land closes said first port.

2. The throttling control valve of claim 1, wherein said drive land and said second land of said valve element are formed as a single unitary land.

3. The throttling control valve of claim 1 or 2, wherein said throttled passage is a through bore formed in the valve element so as to traverse said first land from one side thereof to the other and diametrically opposed side thereof and is skew with respect to the central axis of the valve element.

4. In an automatic transmission for vehicles which comprises a source of line pressure, a source of governor pressure which increases in accordance with increase of the vehicle speed, a first friction engaging means which sets the transmission to a lower speed stage when it is engaged, a second friction engaging means which sets the transmission to a higher speed stage when it is engaged, and a speed shift valve which changes over the supply of said line pressure to said first or second friction engaging means, a system for controlling downshift timing of said transmission comprising a line pressure passage for conducting the line pressure from said speed shift valve to said first friction engaging means and a throttling control valve provided in said passage, said throttling control valve comprising a valve housing having a governor pressure port and a series of first, second, and third ports, a spool-like valve element having a drive land which receives the governor pressure supplied to said governor pressure port so as to generate a force for driving said valve element, a first land which interrupts either the connection between said first and second ports or the connection between said second and third ports in accordance with the shift position of said valve element, a second land which opens or closes said first port, a passage which connects opposite sides of said first land, and a spring which acts on said valve element, wherein said valve element is movable against the action of said spring in accordance with increase of said driving force from a first shift position where said first land does not interrupt the connection between said first, second, and third ports and said second land opens said first port, through a second shift position where said first land interrupts the connection between said first and second ports and said second land opens said first port, through a third shift position where said first land does not interrupt the connection between said second and third ports and said second land closes said first port, to a fourth shift position where said first land interrupts the connection between said second and third ports and said second land closes said first port, wherein said line pressure passage includes a portion composed of first and second passages connected in parallel with each other and connected individually to said first and third ports of said throttling control valve, said second passage including an additional throttling element.

* * * * *